(12) United States Patent
Shimamura et al.

(10) Patent No.: US 6,545,956 B2
(45) Date of Patent: Apr. 8, 2003

(54) DISC PLAYER AND FOCUS SEARCH CONTROL METHOD

(75) Inventors: Takao Shimamura, Kawagoe (JP); Yoshihiro Hashizuka, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 211 days.

(21) Appl. No.: 09/811,624

(22) Filed: Mar. 20, 2001

(65) Prior Publication Data

US 2001/0026506 A1 Oct. 4, 2001

(30) Foreign Application Priority Data

Mar. 31, 2000 (JP) .................................. 2000-099902

(51) Int. Cl.$^7$ ................................................ G11B 7/00
(52) U.S. Cl. ................................ 369/44.27; 369/44.26; 369/53.1
(58) Field of Search .......................... 369/44.23, 44.25, 369/44.26, 44.27, 44.34, 47.1, 53.1, 53.23, 53.45, 93, 94

(56) References Cited

U.S. PATENT DOCUMENTS 6,141,307 A * 10/2000 Yoshioka ................ 369/53.22
6,278,672 B1 * 8/2001 Kobayashi ............... 369/53.23

* cited by examiner

*Primary Examiner*—Muhammad Edun
(74) *Attorney, Agent, or Firm*—Morgan, Lewis & Bockius LLP

(57) ABSTRACT

A disc player can be used in common for discs having different focus positions of an object lens with respect to a recording surface. The disc player carries out focus servo control with respect to the discs and reads out recorded information. The disc player comprises a judging device, a waveform setting device and a focus searching device. The judging device judges a type of disc set at the disc player. The waveform setting device selectively sets a predetermined waveform information in accordance with results of judgement by the judging device, from a plurality of waveform information which are held in advance for use in focus searching for the types of discs. The focus searching device generates a focus search signal based on the waveform information set by the waveform setting device, and carries out focus searching, at a time of start-up of the disc player, before the focus servo control is carried out.

8 Claims, 5 Drawing Sheets

DISC PLAYER AND FOCUS SEARCH CONTROL METHOD

BACKGROUND OF THE INVENTION

1. Field of the Invention

The present invention relates to a technical field of disc players in which a disc-shaped recording medium such as a CD, a DVD or the like is set, a drive signal is applied to a pick-up, and an object lens can be controlled to move in a focussing direction with respect to the surface of the disc.

2. Description of the Related Art

In optical disc players such as, for example, CD players, a laser beam must be accurately converged on the information recording surface of a disc. To this end, by using a focus servo control device, the position of an object lens for pick-up is controlled with respect to the reflecting surface of the disc, such that the object lens is held at a focus position. In such a focus servo control device, a drive signal that corresponds to the distance between the object lens and the disc surface is supplied to the actuator of the object lens.

On the other hand, at the time of start-up of driving of the focus servo control device, the object lens is disposed very far away from the disc surface. Thus, when focus servo control is carried out, focus search must be carried out so that the focus is pulled in. Namely, a focus search signal having predetermined waveform pattern is applied to the actuator. After the object lens is moved to a vicinity of the focus position, processing moves on to focus servo control.

Recently, as more types of discs such as CDs, DVDs and the like have arisen, disc players which can be commonly used for plural types of discs have come to be demanded. In such a disc player, there is the need to drive the actuator in consideration of characteristics of plural discs.

However, comparing a CD with a DVD for example, the distance between the disc surface and the disc reflecting surface differs greatly. Thus, the focus positions of the object lens for focussing do not match with each other. As a result, when the CD and the DVD are driven by a common actuator and object lens, problems arise in that it is difficult to carry out operation for applying the focus search signal to pull-in the focus accurately for both CDs and DVDs, and much time is required for pulling in the focus. Thus, conventionally, there has been the problem that it is not easy to realize a disc player, which is applicable to plural types of disc-shaped recording media having different characteristics.

SUMMARY OF THE INVENTION

An object of the present invention, which was made in consideration of such problems, is to provide a disc player which, when different types of discs are used, can carry out focus searching by using a common actuator without the device structure becoming complicated.

In order to overcome the above-described problems, the first aspect of the present invention provides a disc player, which can be used in common for a plurality of types of discs having different focus positions of an object lens with respect to a recording surface, and which carries out focus servo control with respect to the discs and reads out recorded information, comprising: a judging device which judges a type of disc set at the disc player; a waveform setting device which, from a plurality of waveform information which are held in advance for use in focus searching for the plurality of types of discs, selectively sets a predetermined waveform information in accordance with results of judgement by the judging device; and a focus searching device which, at a time of start-up of the disc player, before the focus servo control is carried out, generates a focus search signal based on the waveform information set by the waveform setting device to carry out focus searching.

In accordance with this invention, when the disc selected from plural types of discs is set at the disc player, the type of the disc is judged, and predetermined waveform information corresponding to the results of judgement is selectively set. Then, the focus search signal based on the waveform information is generated. In this way, after focus searching has been carried out, processing moves on to focus servo and reading of recorded data from the disc is possible. Accordingly, even in a case in which the focus positions with respect to recording surfaces of plural discs are different, by adjusting the characteristic of the focus search signal, such a situation can be handled, and the focus searching can be carried out by providing an optimal characteristic for each disc while using a common actuator.

The second aspect of the present invention provides a disc player according to the first aspect, characterized in that in the disc player according to the first aspect, the waveform information is information for generating triangular, wave-shaped focus search signals, each of which has a predetermined peak value and a predetermined bottom value.

In accordance with this invention, at the time of the focus searching for a plurality of discs, triangular, wave-shaped focus search signals are used, and the peak values and bottom values thereof can be set individually. As a result, it is possible to set a peak value and a bottom value, which are suited for the focus position of each disc. The time for focus searching of each disc can be shortened, and the characteristics can be stabilized.

The third aspect of the present invention provides a disc player according to the first aspect, characterized in that the waveform information is information for generating triangular, wave-shaped focus search signals, for each of which a predetermined initial polarity is set.

In accordance with this invention, at the time of the focus searching for a plurality of discs, triangular, wave-shaped focus search signals are used, and the initial polarities thereof can be set individually. Namely, the initial voltage change direction of the focus search signal can be set to either the positive direction or the negative direction. Accordingly, the direction of the signal change can be freely set in accordance with the direction of the focus position for each disc. The degrees of freedom in the characteristics given to the focus searching can be increased even more.

The fourth aspect of the present invention provides a disc player according to the first aspect, characterized in that the plurality of waveform information include first waveform information set at a time when the type of the disc cannot be judged by the judging device, and the first waveform information has a variation range which corresponds to all of the plurality of types of discs.

In accordance with this invention, at the time when the disc is set at the disc player, if the type of disc cannot be judged, the first waveform information which is prepared therefor is selectively set, and the focus search signal which varies over a wide range during focus searching is used. Accordingly, by using a waveform that encompasses all of a plurality of focus positions of commonly-usable discs, it is possible to avoid a situation in which recorded information of a disc cannot be read.

In order to overcome the above-described problems, the fifth aspect of the present invention provides a focus search control method in a disc player which can be used in common for a plurality of types of discs having different focus positions of an object lens with respect to a recording surface, and which carries out focus servo control with respect to the discs and reads out recorded information, and the focus search control method comprises the steps of: judging a type of disc set at the disc player; selectively setting a predetermined waveform information in accordance with results of the judging, from a plurality of waveform information which are held in advance for use in focus searching for the plurality of types of discs; and generating a focus search signal based on the set waveform information to carry out focus searching, at a time of start-up of the disc player, before the focus servo control is carried out.

In accordance with this invention, when a disc selected from a plurality of types of discs is set at the disc player, the type of the disc is judged, and predetermined waveform information corresponding to the results of judgement is selectively set. Then, the focus search signal based on this waveform information is generated, and focus searching is carried out thereby. After the focus searching is carried out, the process moves on to focus servo, and reading out of recorded data from the disc is possible. Accordingly, even in a case in which focus positions for recording surfaces of plural discs are different, by adjusting the characteristic of the focus search signal, focus searching can be carried out by providing an optimal characteristic for each disc while using a common actuator.

The sixth aspect of the present invention provides the focus search control method according to the fifth aspect, characterized in that the waveform information is information for generating triangular, wave-shaped focus search signals, each of which has a predetermined peak value and a predetermined bottom value.

In accordance with this invention, at the time of focus searching for a plurality of discs, triangular, wave-shaped focus search signals are used, and the peak values and bottom values thereof can be set individually. As a result, it is possible to set a peak value and a bottom value, which are suited for the focus position of each disc. The time for focus searching of each disc can be shortened, and the characteristics can be stabilized.

The seventh aspect of the present invention provides the focus search control method according to the fifth aspect, characterized in that the waveform information is information for generating triangular, wave-shaped focus search signals, for each of which a predetermined initial polarity is set.

In accordance with this invention, at the time of focus searching for a plurality of discs, triangular, wave-shaped focus search signals are used, and the initial polarities thereof can be set individually. Namely, the initial voltage change direction of the focus search signal can be set to either the positive direction or the negative direction. Accordingly, the direction of the signal change can be freely set in accordance with the direction of the focus position for each disc. The degrees of freedom in the characteristics given to the focus searching can be increased even more.

The eighth aspect of the present invention provides the focus search control method according to the fifth aspect, characterized in that the plurality of waveform information include first waveform information set at a time when the type of the disc cannot be judged in the judging step, and the first waveform information has a variation range which corresponds to all of the plurality of types of discs.

In accordance with this invention, at the time when a disc is set at the disc player, if the type of disc cannot be judged, the first waveform information which is prepared therefor is selectively set, and the focus search signal which varies over a wide range during focus searching is used. Accordingly, by using a waveform that encompasses all of a plurality of focus positions of commonly-usable discs, it is possible to avoid a situation in which recorded information of a disc cannot be read.

DESCRIPTION OF THE PREFERRED EMBODIMENT

Hereinafter, a preferred embodiment of the present invention will be described with reference to the drawings. In the present embodiment, description will be given of a case in which the present invention is applied to a disc player which can be used in common for both CDs and DVDS.

Figure 1:
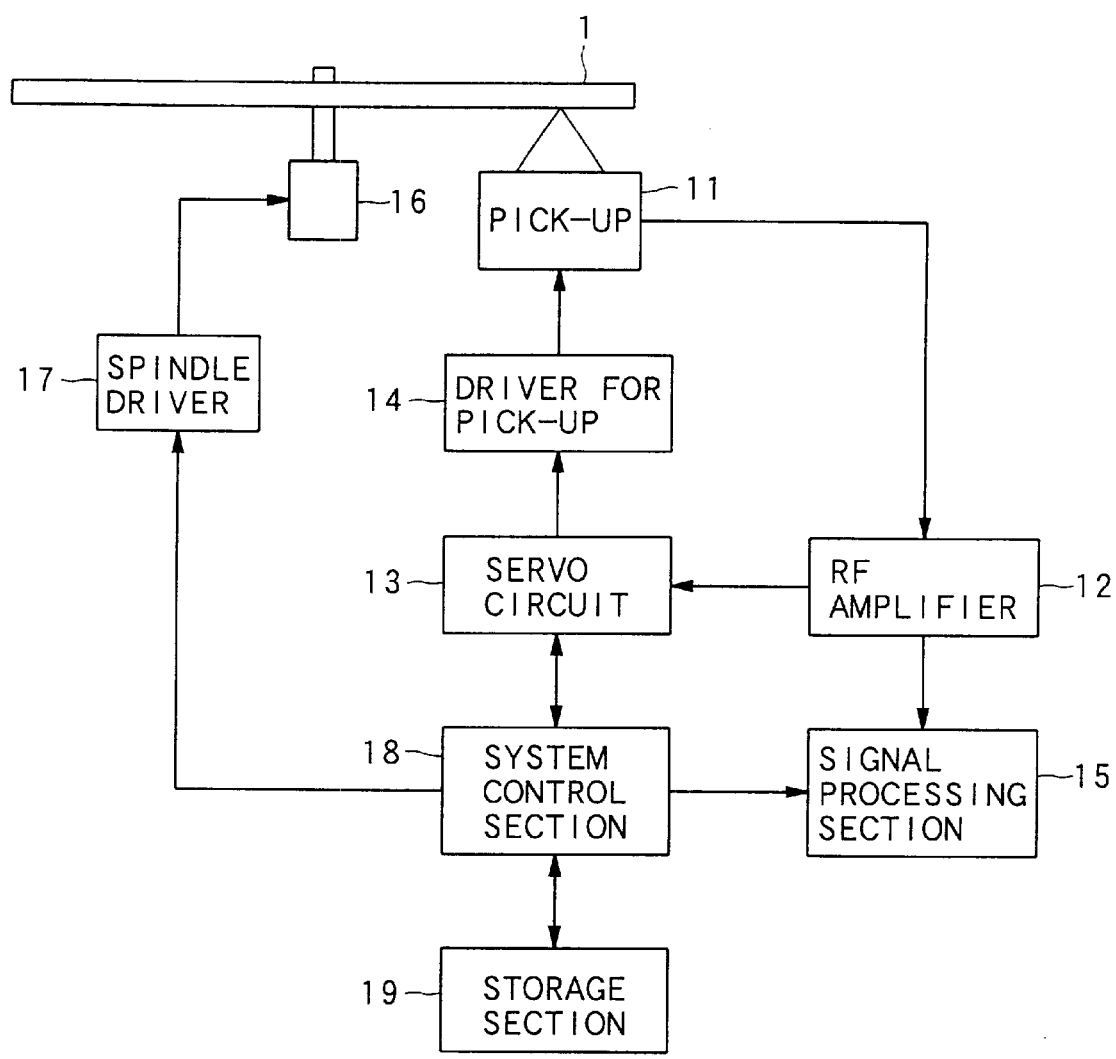
FIG. 1 is a block diagram showing a schematic structure of a disc player according to the embodiment of the present invention.

FIG. 1 is a block diagram showing a schematic structure of the disc player according to the present embodiment. The disc player illustrated in FIG. 1 is composed of a pick-up 11, an RF amplifier 12, a servo circuit 13, a driver 14 for pick-up, a signal processing section 15, a spindle motor 16, a spindle driver 17, a system control section 18, and a storage section 19. A disc 1 is set in the disc player, and recorded data is played back.

In FIG. 1, either of a CD or a DVD can be set as the disc 1 in the disc player according to the present embodiment. When the disc 1 is set in the disc player, as will be described later, it is judged whether the disc 1 is a CD or a DVD, and initialization which is suited for a CD or for a DVD is carried out. While the disc 1 is driven to rotate by the spindle motor 16, a light beam is irradiated thereon by the pick-up 11 and the recorded data is played back.

The pick-up 11 irradiates the laser beam onto an information recording surface of the disc 1 via an optical system, and generates an RF signal on the basis of the reflected light. The generated RF signal is amplified to a predetermined level by the RF amplifier 12, and thereafter, at the signal processing section 15, is subjected to a signal processing such as decoding processing, correction processing or the like, and the recorded data is played back.

On the other hand, an output signal from the RF amplifier 12 is supplied to the servo circuit 13. On the basis thereof, a focus error signal and a tracking error signal are detected at the servo circuit 13. On the basis of the output signal from the servo circuit 13, the driver 14 for pick-up supplies a driving signal to the actuator of the pick-up 11, and carries out focus control and tracking control. Further, under the control of the system control section 18, the spindle driver 17 controls the rotational speed of the spindle motor 16 in order to maintain a proper playing back timing of the disc 1. In the present embodiment, focus searching using a focus search signal is carried out before the focus servo control is carried out. Details thereof will be described later.

The system control section 18 controls the operations of the entire disc player collectively. The system control section 18 is connected to structural elements of each section of the device, and sends and receives data and control signals so as to carry out control. The system control section 18, together with other structural elements as will be described later, functions as the judging device, the waveform setting device, and the focus searching device of the present invention.

Further, the storage section 19 includes a ROM which stores a processing program of the system control section 18, and a RAM which temporarily stores processing data. Moreover, a focus search setting table 19a (FIG. 2), which stores waveform information in order to selectively set a plurality of focus search signals, is contained in the storage section 19. Details on the role and the function of the focus search setting table 19a will be described later.

Figure 2:
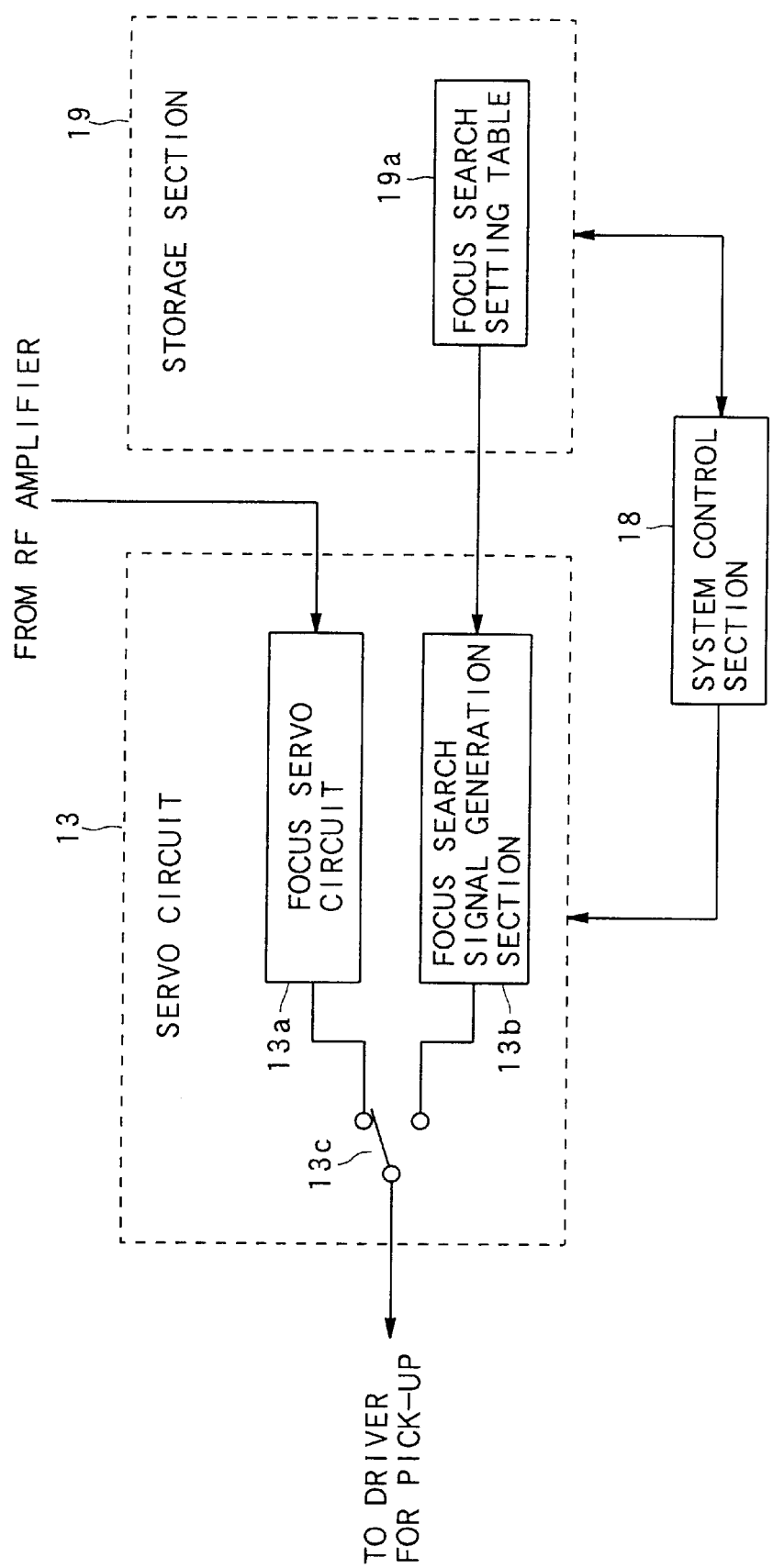
FIG. 2 is a block diagram showing a structure of main portions relating to focus control in the disc player according to the present embodiment.

FIG. 2 is a block diagram showing a structure of main portions relating to the focus control, among the structures of the disc player which is shown in FIG. 1. As illustrated in FIG. 2, a focus servo circuit 13a, a focus search signal generating section 13b, and a change-over switch 13c are included in the servo circuit 13. Further, the system control section 18 sets a predetermined focus search condition for the focus search setting table 19a which is included in the storage section 19.

In FIG. 2, when the focus servo control is started, the change-over switch 13c is switched to the focus search signal generating section 13b side in accordance with control of the system control section 18. Then, the system control section 18 selects waveform information at a time of focus searching from the focus search setting table 19a, in order to match results of judgement described later for the disc 1 which has been set. On the other hand, the focus search signal generating section 13b, generates a focus search signal which is based on the selected waveform information, and supplies the generated focus search signal to the driver 14 for pick-up. Therefore, a driving signal, which corresponds to the selected waveform information, is applied to the pick-up 11, and the distance between the object lens and the disc surface of the disc 1 is controlled properly.

Further, after the focus has been pulled in, when control moves to the normal focus servo control, the change-over switch 13c is switched to the focus servo circuit 13a side in accordance with control of the system control section 18. A focus error signal is fed-back from the RF amplifier 12 to the focus servo circuit 13a, and the focus servo circuit 13a effects control such that the distance between the disc reflecting surface and the object lens is maintained constant.

Thereafter, in a case in which the focus search is started when a new disc 1 is set, the system control section 18 switches the change-over switch 13c to the focus search signal generating section 13b side, and when the focus has been pulled in, the system control section 18 switches again the change-over switch 13c to the focus servo circuit 13a side.

Figure 3:
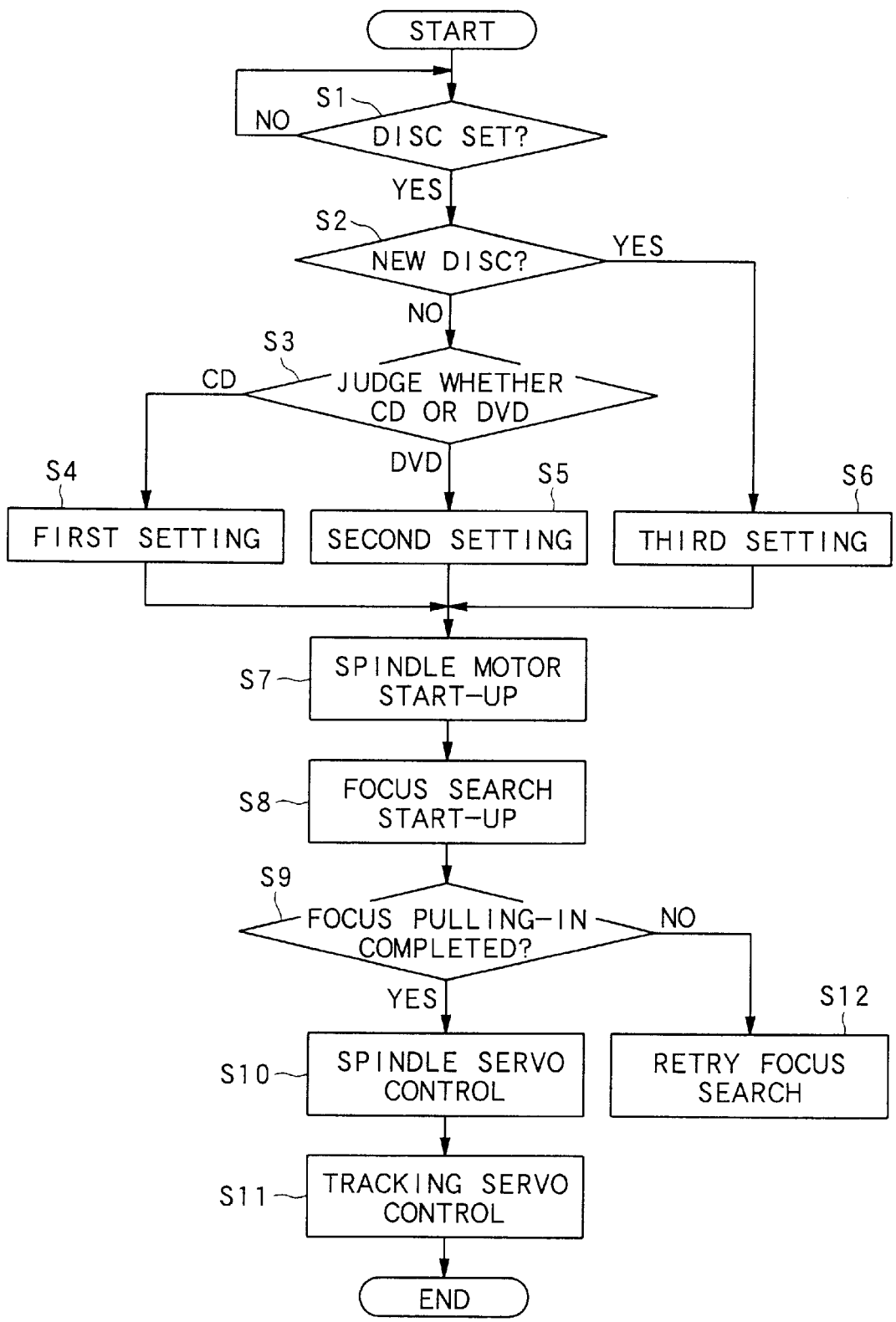
FIG. 3 is a flowchart showing processing carried out at a time of starting up of the disc player according to the present embodiment.

Next, processing carried out at the time of start-up of the disc player according to the embodiment of the present invention will be described with reference to the flowchart of FIG. 3. In FIG. 3, when processing at the disc player is started, a judgement is made as to whether the disc 1 is set or not (step S1). Either a CD or a DVD may be the disc 1 which is set. If, as the results of judgement in step S1, it is judged that the disc 1 is set (step S1: YES), a judgement is made as to whether a new disc 1 is set or not (step S2). On the other hand, in a case in which it is judged that no disc 1 has been set (step S1: NO), the processing of step S1 is continued.

In step S2, if the set disc 1 is a disc that was used before the power of the disc player was turned off, the set disc is not judged as a new disc 1. However, if the disc 1 is a disc that is set at the time when the power of the disc player is turned on, the set disc 1 is judged as a new disc 1. Therefore, the system control section 18 should hold the set state of the disc 1 in a nonvolatile memory, and refer to the memory at the time of start-up of the disc player.

If, as the results of the judgement in step S2, it is judged that no new disc 1 is set (step S2: NO), it is judged whether the disc 1 is a CD or, a DVD (step S3). As a result, if the disc 1 is a CD (step S3: CD), a condition of the focus searching is set in accordance with the first setting (step S4). On the other hand, in a case in which the disc 1 is a DVD (step S3: DVD), the condition of the focus searching is set in accordance with the second setting (step S5). Note that, a CD is provided with a TOC (Table of Contents), but a DVD is not provided with a TOC. Therefore, the judgement of step S3 can be carried out in accordance with whether or not a TOC can be read-out from the disc 1.

Further, at step S2, in a case in which a new disc 1 is set (step S2: YES), the condition of the focus searching is set in accordance with the third setting (step S6). The system control section 18 determines, in accordance with the settings of step S4 through S6, the waveform information to be read-out from the focus search setting table 19a. At these three setting conditions, as will be described later, waveform patterns of the focus search signals are respectively different from each other.

When the settings of steps S4 through S6 have been completed, the spindle motor 16 is activated (step S7). At a CD or a DVD, information is recorded in correspondence with a constant linear velocity. Therefore, the spindle motor 16 is CLV (Constant Linear Velocity)-driven by the spindle driver 17.

Then, the change-over switch 13c is switched to the focus search signal generating section 13b side, and the focus searching, which utilizes the waveform information of the focus search setting table 19a, is started (step S8). Here, waveform patterns of focus search signals which correspond to the aforementioned three setting conditions will be described with reference to FIGS. 4 and 5.

FIGS. 4(a) to 4(c) are graphs showing concrete examples of waveform patterns of the focus search signals which correspond to types of discs. FIG. 4(a) shows a waveform pattern which corresponds to the first setting which is for a CD, FIG. 4(b) shows a waveform pattern which corresponds to the second setting which is for a DVD, and FIG. 4(c) shows a waveform pattern which corresponds to the third setting which is for a new disc. As shown in FIGS. 4(a) to 4(c), the three types of waveform patterns are all triangular, and are patterns in which a voltage range of a predetermined peak voltage and bottom voltage is repeated at a predetermined period. The waveforms are periodic waveforms so that the focus searching can be continued until the focus is pulled in.

Further, FIGS. 4(a) to 4(c) show a predetermined voltage which corresponds to a focus position of a CD, and a predetermined voltage which corresponds to a focus position of a DVD. Moreover, a central voltage Vc, which corresponds to the center of an object lens in the middle of these predetermined voltages. The central voltage Vc locates substantially in the middle of a voltage fluctuation range in the focus searching.

In the waveform pattern which corresponds to the first setting shown in FIG. 4(a), the initial voltage, which starts from the central voltage Vc, is varied in the positive direction at a predetermined inclination angle, and reaches a peak voltage Vp1. Then, the polarity of the voltage is reversed, and the voltage is varied in the negative direction until it reaches the bottom voltage Vb1. At this time, the object lens is driven in accordance with the variations in the voltage, and the voltage line intersects the CD focus position at an intersection point P1. Thus, if the focus closing is carried out at this point in time, the focus searching ends. On the other hand, if the focus closing is not carried out at this point in time, thereafter, the focus searching continues to be carried out by the same waveform pattern.

As can be understood from FIG. 4(a), in the case of the waveform pattern, which corresponds to the first setting, the waveform shifts in the positive direction from the central voltage Vc. This is because the CD focus position shifts in the positive direction. Further, in accordance with the S-shaped characteristic of the focus servo, the voltage of the focus search signal must be varied in wide range. Therefore, the judgement on focus closing is carried out after having passed the peak voltage or the bottom voltage.

In the waveform pattern which corresponds to the second setting and which is shown in FIG. 4(b), the initial voltage starts from the central voltage Vc and the voltage is varied in a predetermined waveform pattern, in the same way as in FIG. 4(a). In FIG. 4(b), the polarity of the waveform variation is the same as that in the case of FIG. 4(a). However, FIG. 4(b) differs from FIG. 4(a) in that the peak voltage is set to Vp2 and the bottom voltage is set to Vb2. Further, it can be seen that the voltage line intersects the DVD focus position at an intersection point P2. In the same way as described above, the determination as to whether focus searching is completed or is continued is carried out in accordance with whether the focus closing is carried out or not at this point in time.

In the case of the waveform pattern corresponding to the second setting, the waveform shifts in the negative direction from the central voltage Vc, and relations of Vp2<Vp1 and Vb2<Vb1 are set. This is based on the fact that the DVD focus position shifts in the negative direction. More specifically, because the CD focus position and the DVD focus position are positioned symmetrically with respect to the central voltage Vc which corresponds to the object lens center, comparing FIG. 4(a) and FIG. 4(b), the waveform patterns are offset oppositely.

In the waveform pattern which corresponds to the third setting and which is shown in FIG. 4(c), the initial voltage starts from the central voltage Vc and the voltage is varied in a predetermined waveform pattern, in the same way as in FIG. 4(a) and FIG. 4(b). In FIG. 4(c), the polarity of the waveform variation is the same as that in the cases of FIG. 4(a) and FIG. 4(b). However, FIG. 4(c) differs from FIG. 4(a) and FIG. 4(b) in that a peak voltage is set to Vp1 and a bottom voltage is set to Vb2. In a case in which the new disc is a CD, an intersection point P3 which intersects the CD focus position is the point in time at which the focus closing is first carried out. On the other hand, in a case in which the new disc is a DVD, an intersection point P4 which intersects the DVD focus position is the point in time at which the focus closing is first carried out. Operations thereafter are the same as those described above.

In the case of the waveform pattern which corresponds to the third setting, the peak voltage Vp1 is set in the same manner as the first setting, and the bottom voltage Vb2 is set in the same manner as the second setting, so that the waveform pattern is set as a wide range which covers both waveform patterns of the first setting and the second setting. In other words, in the third setting, it is not known which of a CD or a DVD is set. Therefore, setting is carried out such that focus searching can be carried out properly if the setting is either of the first setting or the second setting. However, in the case of FIG. 4(c), at the point in time of the intersection point P4 for the DVD, the timing is late as compared with the intersection point P2 of FIG. 4(b). Therefore, the case in which setting is carried out individually is superior from the standpoint of the speed of the focus searching.

Figure 4:
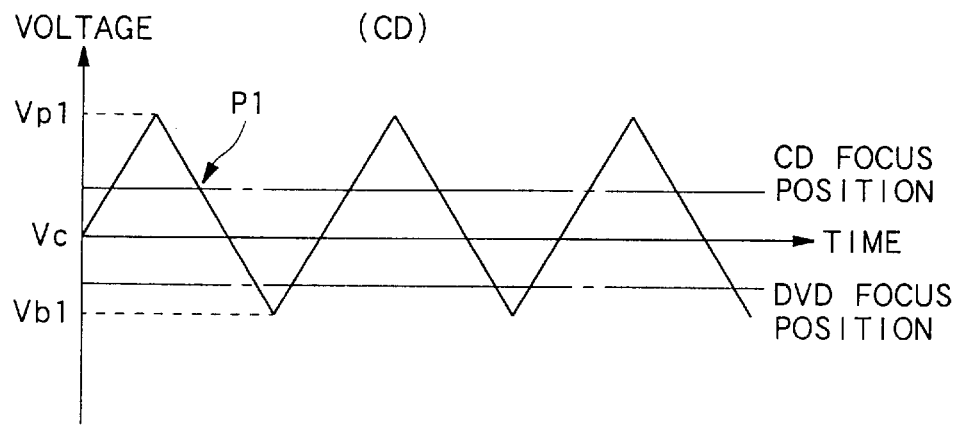
FIGS. 4(a) to 4(c) are graphs showing concrete examples of waveform patterns of focus search signals which correspond to types of discs.
Figure 4:
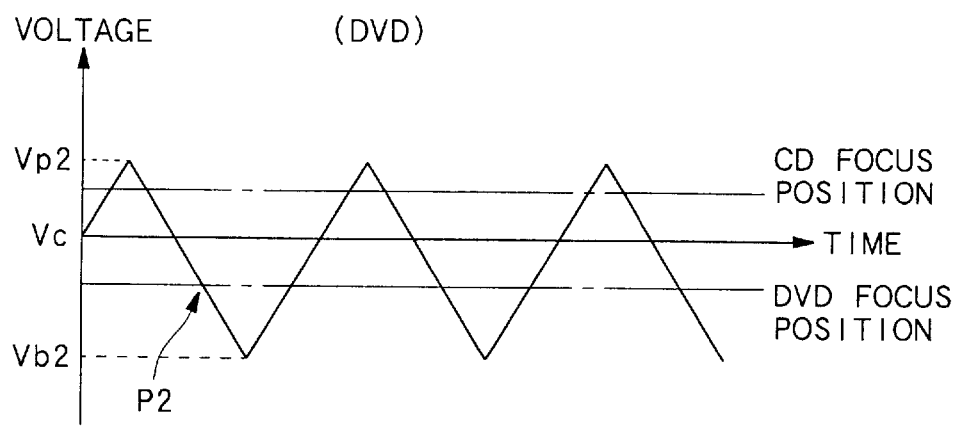
Figure 4:
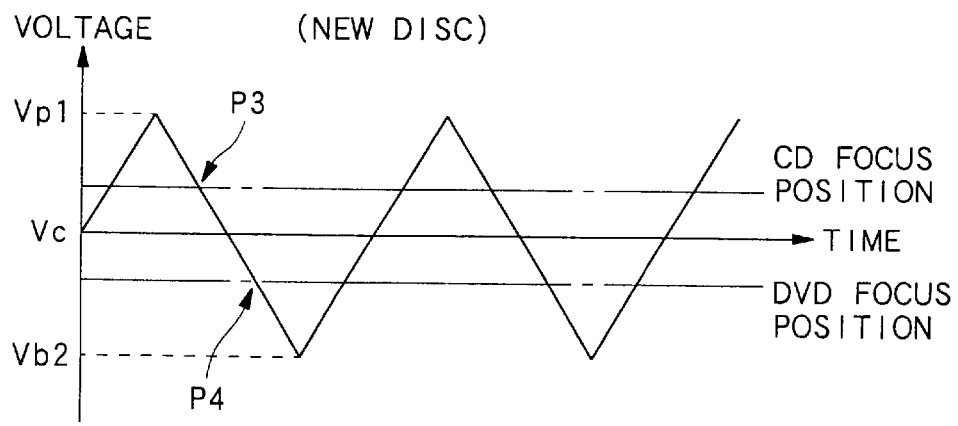
Figure 5:
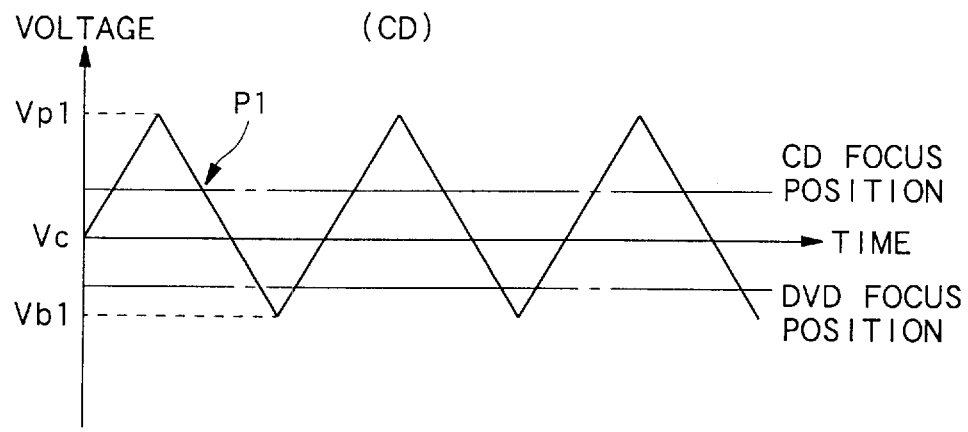
FIGS. 5(a) to 5(c) are graphs showing other concrete examples of waveform patterns of focus search signals, which correspond to types of discs.
Figure 5:
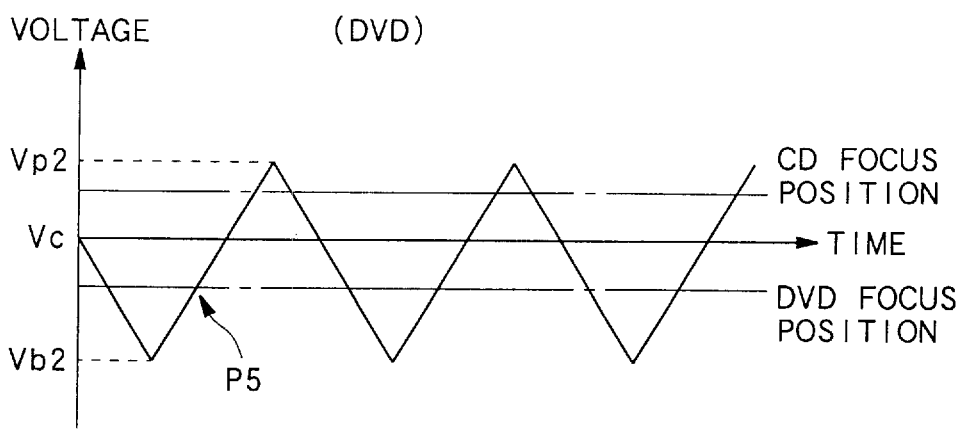
Figure 5:
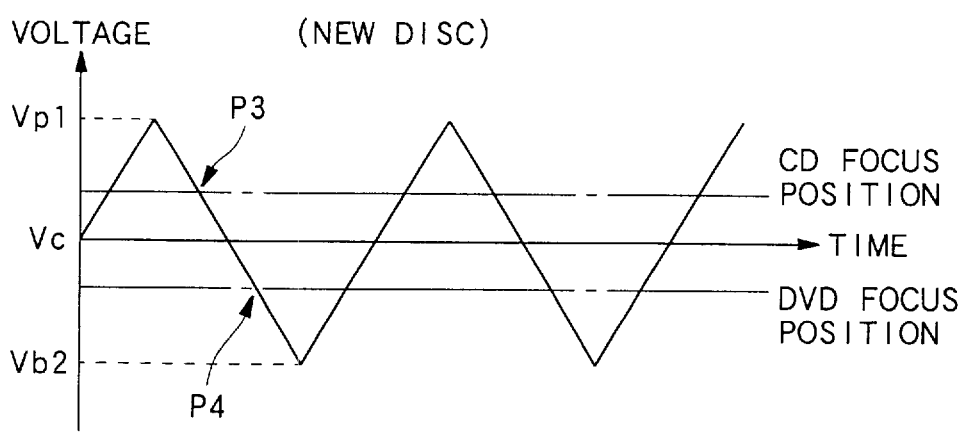

Now, a case in which the focus search signal of FIG. 4 is set to a reversed polarity will be described by using FIG. 5. FIG. 5 illustrates, for the second setting for the DVD, two waveform patterns whose polarities are respectively different from each other. FIG. 5(a) shows the similar waveform pattern to that as shown in FIG. 4(a) and FIG. 5(c) shows the similar waveform pattern to that as shown in FIG. 4(c). Accordingly, an explanation will be given especially with reference to FIG. 5(b).

As can be seen from FIG. 5(b), as compared with the waveform pattern of FIG. 4(b), the polarity of the voltage variation is reversed. Namely, in FIG. 5(b), the point that the initial voltage starts from the central voltage Vc is the same as in FIG. 4(b). However, in the case of FIG. 4(b), the voltage variation thereafter is directed in the positive direction as described above. In contrast, in the case of FIG. 5(b), the voltage variation thereafter is directed in the negative direction. All other points, such as the inclination angle of the waveform, the period, the positive peak voltage Vp2, the bottom voltage Vb2 and the like, in the waveform pattern of FIG. 5(b) are the same as those of FIG. 4(b). Further, in the waveform pattern of FIG. 5(b), the timing of an intersection point P5 which intersects the DVD focus position is different from the case of FIG. 4(b).

As shown in FIG. 5, the polarities of voltage variations of the waveform patterns can be reversed in the cases of the CD and the DVD. Therefore, the degrees of freedom of the focus search characteristics can be increased. In actuality, it suffices to determine the polarity of the waveform pattern in accordance with the state of use of the disc player or the characteristics of the driver 14 for pick-up.

Now, returning to FIG. 3, after start-up of the above-described focus searching, it is judged whether the focus pulling-in is completed or not (step S9). Namely, when the servo circuit 13 is detected as being in a focus closed state at the intersection points P1 through P5 in FIGS. 4 and 5, the focus pulling-in is completed. In the case in which it is determined, as the results of judgement, that focus pulling-in has been completed (step S9: YES), the routine moves on to spindle servo control which is carried out by the spindle driver 17 and the spindle motor 16 (step S10). Thereafter, the routine proceeds to the tracking servo control by the servo circuit 13 and the driver 14 for pick-up (step S11), and the processing of FIG. 3 ends.

On the other hand, if it is judged, in the judgement of step S9, that the focus pulling-in is not completed (step S9: NO), re-trial of the focus searching is carried out (step S12).

Namely, in the case of FIG. 4(a) for example, if the focus pulling-in is not completed at the intersection point P1, the focus searching is continued until the next intersection point is reached as described above.

As described above, the disc player according to the embodiment of the present invention is structured such that the both a CD and a DVD can be used as the disc, and such that the focus searching is carried out by selectively using the optimal focus search signal after the type of the disc which is set at the time of start-up has been judged. Therefore, if a plurality of waveform information of focus search signals are readied, it is possible to carry out focus searching for both a CD and a DVD by using a common structure, resulting in simplification of the structure of the device and in reduction of manufacturing cost. Further, waveform patterns which are suited for characteristics of a CD and a DVD respectively can be set freely, and it is possible to carry out the focus searching in a short time.

There is described the embodiment in which a CD and a DVD are used as the discs. However, in addition to the above-described case, it is also possible to apply the present invention to a case in which a plural types of discs having different characteristics are used. Further, in the above embodiment, the waveform pattern of the focus search signal is triangular. However, the present invention is not limited only to such a structure, and various different waveform patterns which can be generated may be used.

The entire disclosure of Japanese Patent Application No. 2000-099902 filed on Mar. 31, 2000 including the specification, claims, drawings and summary is incorporated herein by reference in its entirety.

What is claimed is:

1. A disc player which can be used in common for a plurality of types of discs having different focus positions of an object lens with respect to a recording surface, and which carries out focus servo control with respect to the discs and reads out recorded information, the disc player comprising:
   a judging device which judges a type of disc set at the disc player;
   a waveform setting device which, from a plurality of waveform information which are held in advance for use in focus searching for the plurality of types of discs, selectively sets a predetermined waveform information in accordance with results of judgement by the judging device; and
   a focus searching device which, at a time of start-up of the disc player, before the focus servo control is carried out, generates a focus search signal based on the waveform information set by the waveform setting device, and carries out focus searching.

2. The disc player according to claim 1, wherein the waveform information is information for generating triangular, wave-shaped focus search signals, each of which has a predetermined peak value and a predetermined bottom value.

3. The disc player according to claim 1, wherein the waveform information is information for generating triangular, wave-shaped focus search signals, for each of which a predetermined initial polarity is set.

4. The disc player according to claim 1, wherein the plurality of waveform information include waveform information set at a time when the type of the disc cannot be judged by the judging device, and the waveform information has a variation range which corresponds to all of the plurality of types of discs.

5. A focus search control method in a disc player which can be used in common for a plurality of types of discs having different focus positions of an object lens with respect to a recording surface, and which carries out focus servo control with respect to the discs and reads out recorded information, the focus search control method comprising the processes of:
   judging a type of disc set at the disc player;
   selectively setting a predetermined waveform information in accordance with results of the judging, from a plurality of waveform information which are held in advance for use in focus searching for the plurality of types of discs; and
   generating a focus search signal based on the set waveform information and carrying out focus searching, at a time of start-up of the disc player, before the focus servo control is carried out.

6. The focus search control method according to claim 5, wherein the waveform information is information for generating triangular, wave-shaped focus search signals, each of which has a predetermined peak value and a predetermined bottom value.

7. The focus search control method according to claim 5, wherein the waveform information is information for generating triangular, wave-shaped focus search signals, for each of which a predetermined initial polarity is set.

8. The focus search control method according to claim 5, wherein the plurality of waveform information include waveform information set at a time when the type of the disc cannot be judged in the judging process, and the waveform information has a variation range which corresponds to all of the plurality of types of discs.

* * * * *